United States Patent [19]
Orsi et al.

[11] Patent Number: 5,178,031
[45] Date of Patent: Jan. 12, 1993

[54] WRIST FOR AN INDUSTRIAL ROBOT

[75] Inventors: Mario Orsi, Turin; Mauro Amparore, Beinasco, both of Italy

[73] Assignee: Comau S.p.A., Turin, Italy

[21] Appl. No.: 827,721

[22] Filed: Jan. 29, 1992

[30] Foreign Application Priority Data

Mar. 4, 1991 [IT] Italy .................................. 150 A/91

[51] Int. Cl.$^5$ ........................................... B25J 18/00
[52] U.S. Cl. .................................... 74/479; 901/2;
    901/14; 901/15; 901/19; 318/568.11; 414/4
[58] Field of Search ................ 74/479; 901/2, 14, 15,
    901/19, 23, 25, 29; 318/568.11; 414/4

[56] References Cited

U.S. PATENT DOCUMENTS

| 4,425,818 | 1/1984 | Asada et al. ..................... 901/15 X |
| 4,507,043 | 3/1985 | Flatau ............................. 901/15 X |
| 4,512,710 | 4/1985 | Flatau ............................. 901/15 X |
| 4,518,308 | 5/1985 | Grzybowski et al. ............ 901/15 X |
| 4,812,104 | 3/1989 | Suzuki ............................. 901/15 X |
| 5,008,832 | 4/1991 | Torii et al. ....................... 901/2 X |

FOREIGN PATENT DOCUMENTS

| 0044548 | 1/1982 | European Pat. Off. . |
| 0070781 | 1/1983 | European Pat. Off. . |
| 0074882 | 3/1983 | European Pat. Off. . |
| 0080416 | 6/1983 | European Pat. Off. . |
| 0164210 | 12/1985 | European Pat. Off. . |
| 2590337 | 5/1987 | France . |
| 88/00515 | 1/1988 | World Int. Prop. O. . |

OTHER PUBLICATIONS

European Search Report for Applicants' corresponding EP Application No. 92 83 0099.5 (mailed Jun. 23, 1992).

*Primary Examiner*—Leslie A. Braun
*Assistant Examiner*—William O. Trousdell
*Attorney, Agent, or Firm*—Fish & Richardson

[57] ABSTRACT

A robot wrist with two articulation axes has a first body which is carried at the distal end of the robot arm, a second body which is supported by the first body for rotation about a first axis which intersects the longitudinal axis of the robot arm at right angles, and a third body which is supported by the second body for rotation about a second axis which intersects the first axis at right angles. The second and third bodies are rotated by two electric motors which are mounted on the first body and the second body respectively, with the interposition of "Harmonic Drive" reduction units of the type in which the output rotor is supported for rotation by a load-bearing element which forms part of the reduction unit.

4 Claims, 4 Drawing Sheets

WRIST FOR AN INDUSTRIAL ROBOT

The present invention relates to wrists for industrial robots.

BACKGROUND OF THE INVENTION

For some time, the Applicant has produced a wrist for an industrial robot having:
a first body which is intended to be carried by the distal end of a robot arm which has a longitudinal axis,
a second body which is rotatable on the first body about a second axis which intersects the longitudinal axis of the robot arm at right angles,
a third body which is rotatable on the second body about a third axis which intersects the second axis at right angles,
first and second electric motors for rotating the second and third bodies respectively, and
first and second "Harmonic Drive" reduction units which are interposed in the connection between the first motor and the second body and in the connection between the second motor and the third body, respectively,
each reduction unit including:
a load-bearing element which is fixed to the first body or the second body, respectively,
an input rotor which is supported for rotation on the load-bearing element by a rolling bearing, and
an output rotor which is coaxial with the input rotor and is supported for rotation by a rolling bearing on a structure fixed to the load-bearing element.

In the aforementioned robot, which was previously produced by the Applicant, both of the motors for driving the wrist were carried by the structure of the robot arm and were connected to the two rotary bodies of the wrist by means of mechanical transmissions so that the activation of only one of the motors not only rotated the respective rotary body but also affected the rotation of the other rotary body of the wrist. In order to rotate the second body or the third body alone, it was therefore necessary to operate both of the motors according to a predetermined criterion. Another disadvantage of the known solution consists of the fact that the structure which supported the output rotor of each reduction unit for rotation did not form part of the reduction unit but was a part of the robot wrist. Consequently, when the wrist was assembled, a rolling bearing had to be provided between the support structure and the output rotor of the reduction unit. Assembly was therefore quite laborious and lengthy.

SUMMARY

In order to avoid these problems, the subject of the present invention is a wrist of the type indicated above, characterised in that:
a) the first electric motor is mounted on the first body,
b) the second electric motor is mounted on the second body, and
in each of the two reduction units, the structure which supports the output rotor of the reduction unit for rotation is constituted by the load-bearing element which forms part of the reduction unit.

These characteristics overcome the problems of the prior art. Firstly, each of the two electric motors can rotate the body driven thereby without causing a parasitic rotation of the other body. Secondly, each of the two reduction units can be mounted easily by fixing its load-bearing element to the respective body without the need to provide and fit an additional bearing separate from the reduction unit.

BRIEF DESCRIPTION OF THE DRAWINGS

The unit will now be described with reference to the appended drawings, provided purely by way of non-limiting example, in which.

DESCRIPTION OF THE PREFERRED EMBODIMENT

Figure 1:
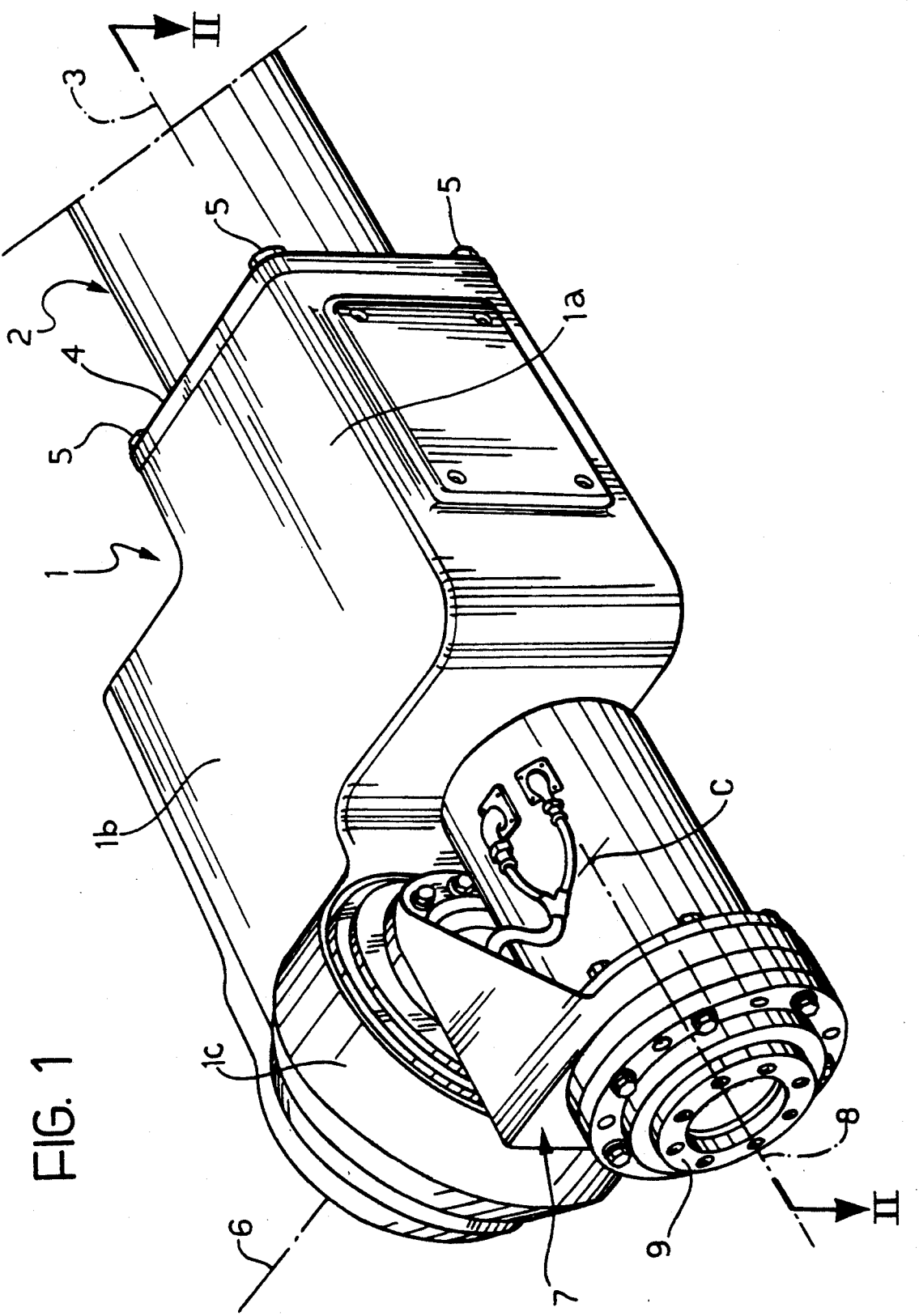
FIG. 1 is a schematic, perspective view of a robot wrist according to the invention.

FIG. 1 shows a wrist for an articulated industrial robot including a first body 1 which is fixed to the distal end of an articulated arm 2 of the robot. In a typical application, the wrist 1 is intended to be used on an articulated robot with six axes of the type produced and marketed by the Applicant, for example, under the trade mark "SMART". This known robot includes a base which is rotatable on a fixed support about a vertical axis (this axis is commonly defined by experts as the "axis 1" of the robot). In turn, the base carries a structure which is rotatable about a horizontal axis (the "axis 2" of the robot). This structure, in turn, has an arm which is articulated about a further horizontal axis (the "axis 3") and has an end portion which is rotatable about the longitudinal axis (the "axis 4") of the arm. The end portion of the arm, in turn, carries a wrist with two further axes of articulation (the "axis 5" and the "axis 6" of the robot) and has an operating tool at its end.

The invention relates, in particular, to the structure of the wrist. The portion 2 in FIG. 1 is the end portion of the robot arm which is rotatable about its longitudinal axis 3 relative to the rest of the arm (not shown).

In the embodiment shown (see also FIG. 2) the end of the hollow body of the portion 2 has a flange 4 which is fixed to the body 1 of the wrist by screws 5.

Still with reference to the illustrated embodiment, the body 1 of the wrist has a substantially S-shaped configuration with a first portion 1a which is aligned with the longitudinal axis 3 of the arm 2, a second portion 1b which extends sideways at 90° to the longitudinal axis 3, and a third portion 1c which also extends longitudinally but along a line parallel to and spaced from the longitudinal axis 3. The end portion 1c of the body 1 of the wrist supports a second body 7 for rotation about an axis 6. The axis 6 intersects the axis 3 at right angles. The body 7 in turn supports, for rotation about an axis 8, a third body 9 which constitutes the end portion of the wrist to which the operating tool is intended to be fixed. The axis 8 is perpendicular to the axis 6. Moreover, in the embodiment illustrated, the three axes 3, 6 and 8 intersect each other at a single point C.

According to the aforementioned terminology commonly used by experts in the robots field, the axes 6 and 8 shown in FIG. 1 constitute the "axis 5" and the "axis 6" of the robot.

Figure 4:
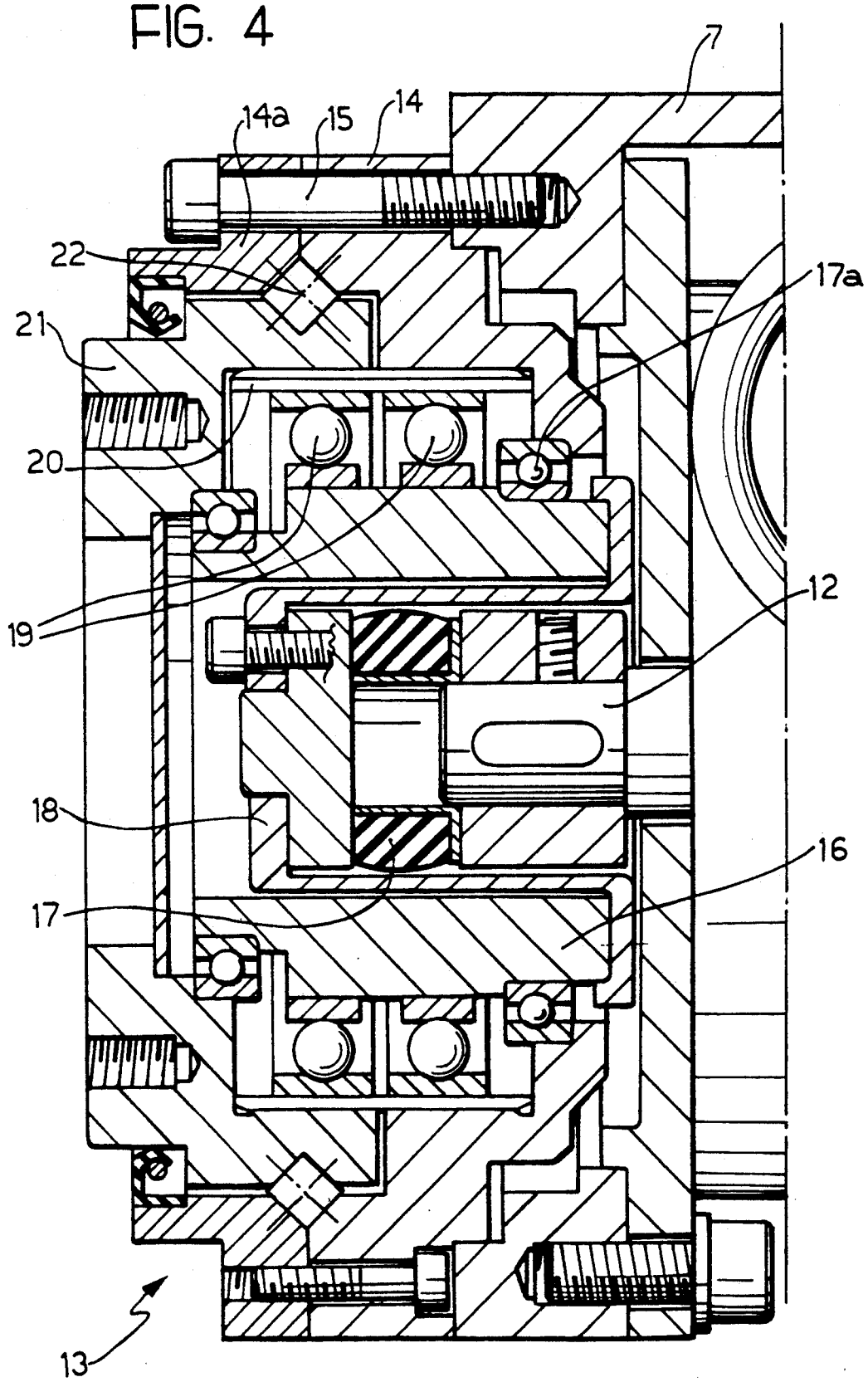
FIG. 4 is a view of the detail indicated by the arrow IV of FIG. 2, on an enlarged scale.

In the wrist according to the invention, the body 9 is rotated relative to the body 7 about the axis 8 by an electric motor 10 the casing of which is mounted on the body 7. In particular, the casing of the motor 10 has a flange 10a which is fixed to the structure of the body 7 by screws 11. The output shaft of the motor 10 is indicated 12 and rotates the body 9 by means of a reduction unit 13 of the type marketed under the trade mark "Harmonic Drive" by the company Harmonic Drive System GmbH. This reduction unit, generally indicated 13, includes an annular load-bearing element 14 which is fixed to the body 7 by screws 15 (only one of which is visible in FIGS. 2 and 4). The reduction unit 13 also includes an input rotor 16 which is rotatable in the load-bearing element 14 with the interposition of a bearing 17a. In the embodiment of FIG. 4, the input rotor 16 is driven by the shaft 12 of the electric motor with the interposition of a resilient coupling 17 and a cup-shaped transmission member 18, the base of which is connected to the shaft 12 by means of the coupling 17 and the mouth of which has an annular flange which is connected to the input rotor 16 by screws (not shown). The input rotor 16 supports, by means of a pair of rolling bearings 19, a ring gear 20 which meshes with sets of internal teeth in the element 14 and in an output rotor 21, each set having a different number of teeth. The structural details of the reduction unit 13 may, however, be of any known type and do not fall within the scope of the present invention.

The important aspect to be underlined is that the reduction unit 13 is of the type in which the output rotor 21 is supported for rotation, by means of a rolling bearing 22, by the load-bearing structure 14 itself and by a ring 14a which is fixed to the element 14 by the screws 15. This differentiates the assembly of the wrist according to the invention from known solutions in which the "Harmonic Drive" reduction units used were of the type in which the output rotor was not supported for rotation by the load-carrying element of the reduction unit itself but by the structure 7 of the wrist, by means of a rolling bearing which did not form part of the reduction unit and therefore had to be provided and fitted when the reduction unit was fitted on the wrist.

Figure 2:
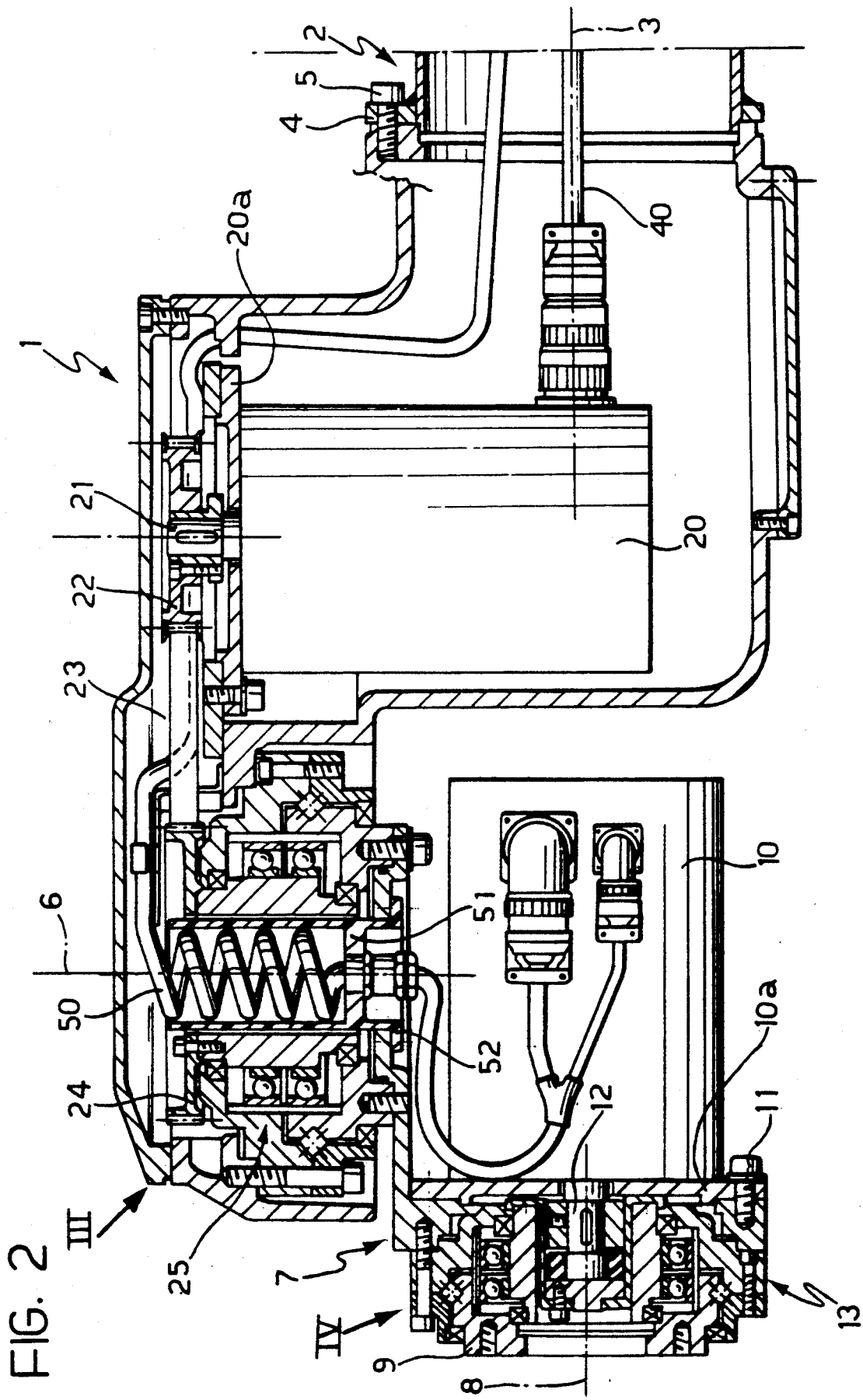
FIG. 2 is a section taken on the line II—II of FIG. 1.
Figure 3:
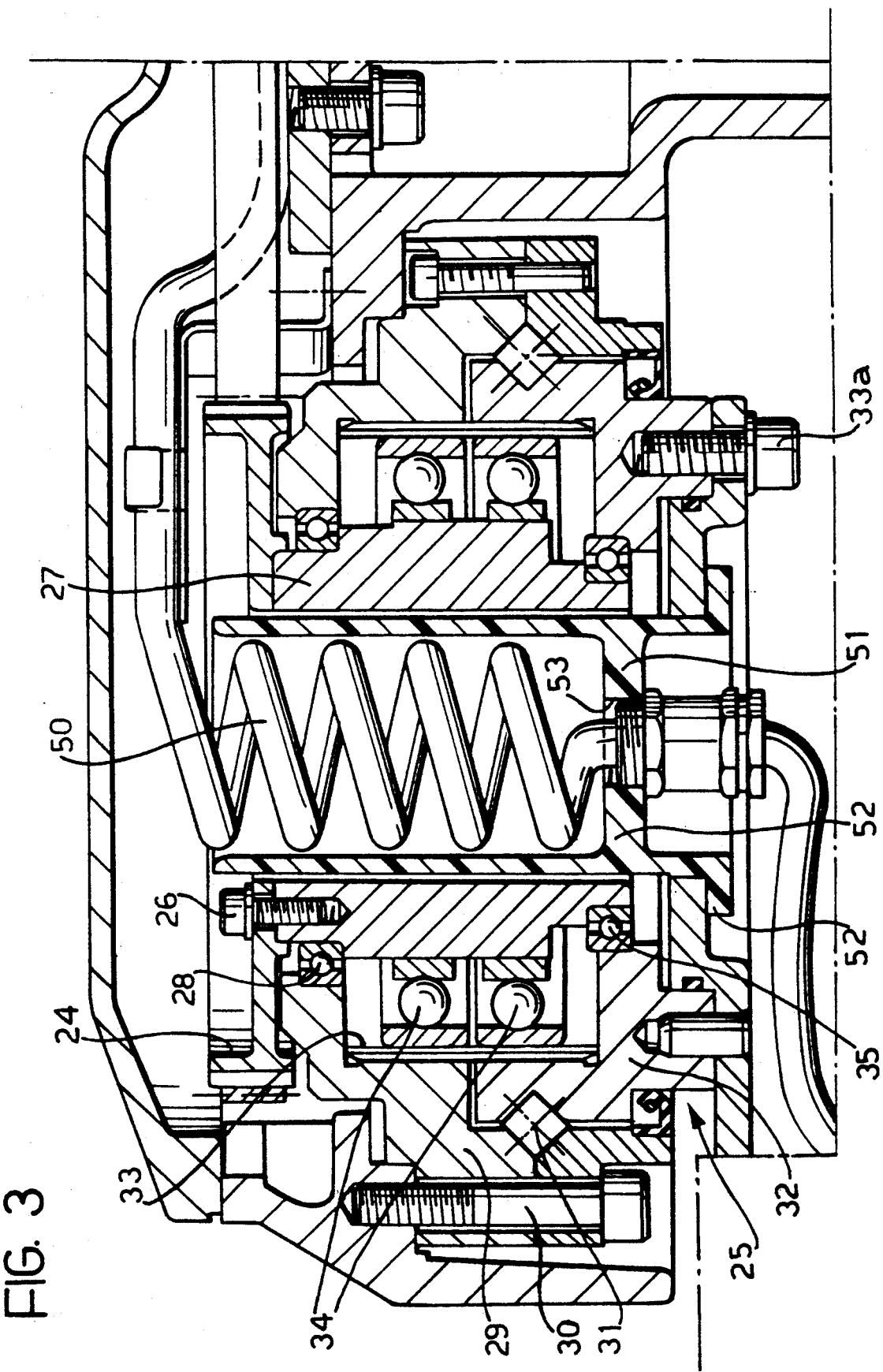
FIG. 3 is a view of the detail indicated by the arrow III in FIG. 2, on an enlarged scale.

With reference to FIGS. 2 and 3, the body 7 is rotated about the axis 6 by an electric motor 20, the casing of which has a flange 20a which is fixed to the structure of the body 1. The axis of the shaft 21 of the motor 20 is perpendicular to the axis 3 and the shaft 21 rotates the body 7 by means of a mechanical transmission including a pulley 22 mounted on the shaft 21 and a belt 23 which transmits the rotation from the pulley 22 to a pulley 24 which in turn rotates the body 7 by means of a reduction unit 25 just like the unit 13 described above. In particular (FIG. 3), the pulley 24 is fixed by screws 26 to the input rotor 27 of the reduction unit 25. The rotor 27 is supported for rotation in the annular load-bearing element 29 of the reduction unit 25 by a bearing 28. The load-bearing element 29 is fixed to the structure of the body 1 by screws 30 and supports the output rotor 32 for rotation by means of a rolling bearing 31. The output rotor 32 is fixed directly to the body 7 of the wrist by screws 33a. The input rotor 27 of the reduction unit 25 also supports, by means of bearings 34, a ring gear 33 which meshes with sets of internal teeth on the load-bearing element 29 and on the output rotor 32, each set having a different number of teeth. A bearing 35 is also interposed between the input rotor 27 and the output rotor 32.

The wires for supplying the electric motor 20 are housed in a single sheath 40 which extends through the hollow structure of the arm 2 (FIG. 2). The supply wires for the motor 10 also extend through the hollow structure of the arm 2 and have helical portions 50 which reach the motor 10 through the hollow structure of the arm 2, their axes coinciding with the axis 6. The helical portions 50 of the supply wires for the motor 10 are preassembled in a cartridge 51 of plastics material having a tubular cylindrical body with an end flange 52 which is fixed to the structure of the body 7 by screws (not shown), the tubular body of the cartridge 51 having an end wall 52 with a hole 53 through which the end part of the helical portions of the wires 50 can pass. This arrangement prevents the cable from being twisted when the body 7 rotates about the axis 6.

It is clear from the foregoing description that each of the two motors 10 and 20 can rotate the respective body 7, 9, about its axis 6, 8 without causing parasitic rotations of the other body. Moreover, the assembly of the wrist is simplified, in particular, because the reduction units can be assembled simply by fixing their load-bearing elements to the structures of the body 1 and the body 7 respectively, without the need for additional support elements such as rolling bearings between the structure of the reduction unit and the structure of the wrist.

Naturally, the principle of the invention remaining the same, the details of construction and forms of embodiment may be varied widely with respect to those described and illustrated purely by way of example. For example, the wrist according to the invention may be applied to a "cartesian" industrial robot, that is, a robot of the type with slides which are movable along three mutually perpendicular axes.

We claim:

1. A wrist for an industrial robot having:
   a first body which is intended to be carried by the distal end of a robot arm which has a longitudinal axis,
   a second body which is rotatable on the first body about a second axis which intersects the longitudinal axis of the robot arm at right angles,
   a third body which is rotatable on the second body about a third axis which intersects the second axis at right angles,
   first and second electric motors for rotating the second and third bodies respectively, and
   first and second "Harmonic Drive" reduction units which are interposed in the connection between the first motor and the second body and in the connection between the second motor and the third body, respectively,
   each reduction unit including:
   a load-bearing element which is fixed to the first body or the second body, respectively,
   an input rotor which is supported for rotation on the load-bearing element by a rolling bearing, and
   an output rotor which is supported for rotation by a rolling bearing on a structure fixed to the load-bearing element,
   wherein:
   a) the first electric motor is carried by the first body,
   b) the second electric motor is carried by the second body,
   c) the structure which supports the input rotor of each reduction unit for rotation is constituted by the load-bearing element which forms part of the reduction unit, and
   d) the first motor is mounted with a first axis perpendicular to the longitudinal axis of the robot arm and drives the second body by means of a belt transmission and the first reduction unit which is mounted so that its axis coincides with the first axis.

2. A wrist according to claim 1, wherein the second motor is mounted on the second body with its axis coinciding with the second axis and its output shaft drives the third body with the interposition of the second reduction unit which is mounted so that its axis concides with the second axis.

3. A wrist according to claim 1, wherein the first body has a substantially S-shaped configuration so that the longitudinal axis of the robot arm and the first and second axes intersect each other at a single point.

4. A robot wrist according to claim 1, wherein the wires for supplying the second electric motor carried by the second body have helical portions the axes of which coincide with the first axis and which are disposed in a tubular cylindrical cartridge fixed to the second body.

* * * * *